(12) United States Patent
Reeves et al.

(10) Patent No.: US 8,965,306 B1
(45) Date of Patent: Feb. 24, 2015

(54) WIRELESS DEVICE COMMUNICATION

(75) Inventors: Raymond E. Reeves, Olathe, KS (US);
John A. Hale, Emeryville, CA (US);
Ryan A. Wick, Apollo Beach, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 358 days.

(21) Appl. No.: 13/438,568

(22) Filed: Apr. 3, 2012

(51) Int. Cl.
*H04B 1/38* (2006.01)

(52) U.S. Cl.
USPC ......................................... 455/90.3

(58) Field of Classification Search
CPC ............................... H04W 88/06; H04W 88/04
USPC ................... 455/552.1, 553.1, 41.2, 90.3
See application file for complete search history.

(56) References Cited

U.S. PATENT DOCUMENTS

| | | | |
|---|---|---|---|
| 7,321,784 B2 * | 1/2008 | Serceki et al. | 455/557 |
| 7,350,011 B2 * | 3/2008 | Keely et al. | 710/303 |
| 7,515,937 B2 * | 4/2009 | Lee | 455/557 |
| 7,885,687 B2 * | 2/2011 | Serceki et al. | 455/558 |
| 7,916,467 B2 * | 3/2011 | Hotelling et al. | 361/679.41 |
| 8,482,403 B2 * | 7/2013 | Thorn | 340/539.11 |
| 2008/0216125 A1 * | 9/2008 | Li et al. | 725/62 |
| 2009/0201222 A1 * | 8/2009 | Damian | 345/1.1 |
| 2009/0318185 A1 * | 12/2009 | Lee | 455/550.1 |
| 2010/0058205 A1 * | 3/2010 | Vakil et al. | 715/761 |
| 2011/0117841 A1 * | 5/2011 | Thorn et al. | 455/41.2 |
| 2011/0136541 A1 * | 6/2011 | Chang et al. | 455/558 |

* cited by examiner

*Primary Examiner* — April G Gonzales

(57) ABSTRACT

A wireless device comprises a first unit and a second unit. Each of the first and second units comprises a respective transceiver, controller, display, and housing to support the transceiver, controller, and display. When the first and second units communicate through the first and second transceivers, the wireless device communicates with a communication network through one of the first or second transceiver.

16 Claims, 7 Drawing Sheets

WIRELESS DEVICE COMMUNICATION

TECHNICAL BACKGROUND

Developments in hardware, including advances in the size and resolution of displays, the size and capacity of batteries, and processor size and capability, have enabled the production of portable hand-held devices capable of a variety of functions. Examples of such electronic devices include various computing platforms, cell phones, smart phones, personal digital assistants, digital cameras and other image forming devices, digital audio playback and recording devices, and an array of other devices.

However, the size of the display of a hand-held electronic device, while advantageous for portability, can also limit the amount of information which can be displayed on a single screen. In some cases, information can be displayed on a portable device display in a simplified manner (such as with less information or fewer graphical elements), or in a different manner (such as with text or graphical elements rearranged), as compared to devices with larger displays. In many cases, however, it is either not possible to display information in a simplified or reduced manner, or while it may be possible the resulting display of information is severely degraded.

Overview

A wireless device comprises a first unit and a second unit. The first unit comprises a first transceiver, a first controller, a first display, and a first housing to support the first transceiver, first controller, and first display. The second unit comprises a second transceiver, a second controller, a second display, and a second housing to support the second transceiver, second controller, and second display. When the first and second units communicate through the first and second transceivers, the wireless device communicates with a communication network through one of the first or second transceiver.

DETAILED DESCRIPTION

A wireless device comprises a first unit and a second unit. Each of the first and second units comprises a respective transceiver, controller, display, and housing to support the transceiver, controller, and display. When the first and second units communicate through the first and second transceivers, the wireless device communicates with a communication network through one of the first or second transceiver. In an embodiment, the first unit and the second unit each are assigned a unique network identifier when the wireless device communicates with the communication network.

Figure 1:
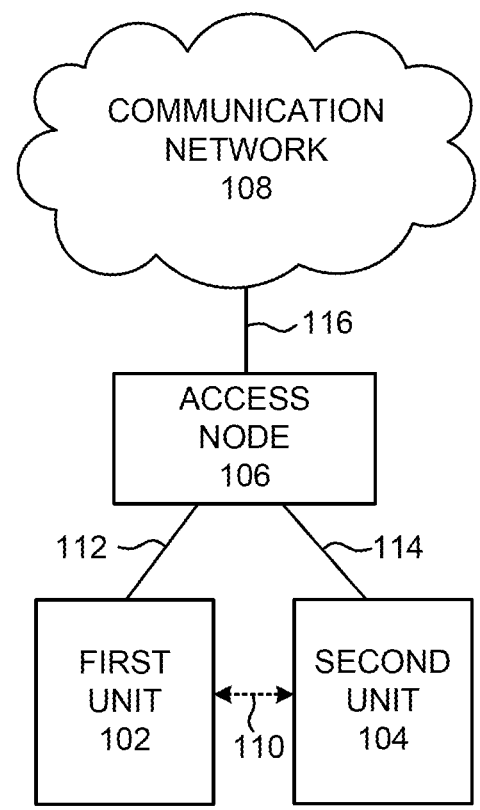
FIG. 1 illustrates an exemplary communication system to control wireless device communication.

FIG. 1 illustrates an exemplary communication system 100 to control wireless device communication comprising a wireless device (comprising first unit 102 and second unit 104), access node 106, and communication network 108. Examples of first unit 102 and second unit 104 include a cell phone, a smart phone, a computing platform such as a laptop, palmtop, or tablet, a personal digital assistant, an internet access device, and combinations thereof. First unit 102 and second unit 104 can communicate through communication link 110. First unit 102 and second unit 104 can also communicate with access node 106 through communication links 112 and 114, respectively. Access node 106 is a network node capable of providing wireless communications to first and second units 102, 104, and can be, for example, a base transceiver station or an eNodeB device. Access node 106 is in communication with communication network 108 through communication link 116.

Communication network 108 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), as well as short range communication protocols such as Bluetooth, WiFi, ZigBee, and other IEEE 802 standards. Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 112, 114, and 116 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Figure 2:
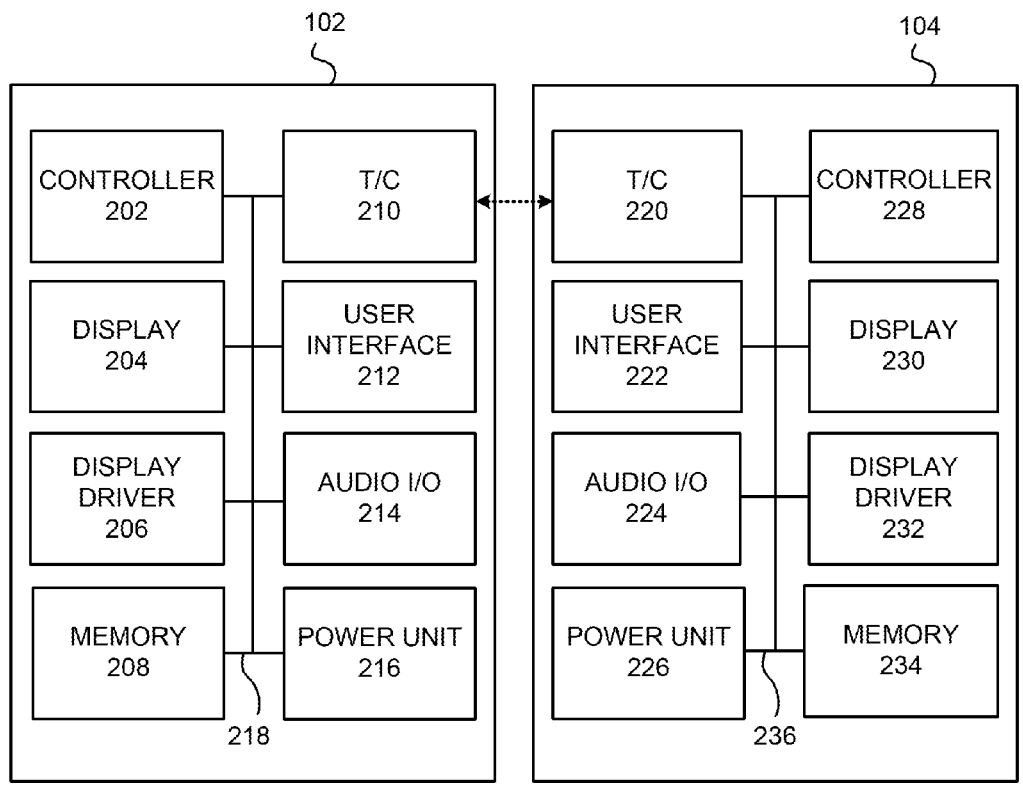
FIG. 2 illustrates an exemplary first and second units.

FIG. 2 illustrates an exemplary wireless device comprising first unit 102 and second unit 104. First unit 102 comprises controller 202, display 204, display driver 206, memory 208, transceiver 210, user interface 212, audio input/output 214, and power unit 216. Display 204 can display information, and can be coupled with user interface 212 to receive input, such as by a touch screen or similar device. Display driver 206 controls the display of information on display 204. Memory 208 can comprise, for example, a disk drive, a flash drive, a solid state memory device, a memory circuitry, or some other memory device, in various forms of volatile and non-volatile memory storage. Memory 208 can store machine-readable data and instructions comprising computer programs, firmware, an operating system, utilities, drivers, network interfaces, applications, and data for the foregoing.

Transceiver 210 enables first unit 102 to communicate wirelessly, for example, with access node 106, and with second unit 104. Wireless signals for example comprise radio frequency, microwave, infrared, laser, visible light, and other similar signals. First unit 102 also comprises an audio input and output, such as audio I/O 214, which can comprise a speaker to produce sound and/or a microphone to receive sound input. Power unit 216 can store and provide power to the other elements of first unit 102. Controller 202 can retrieve and execute software from memory 208, process data, and can communicate with and control the operation of elements 204, 206, 208, 210, 212, 214 and 216 through communication link 218, which can be, for example, a communication bus. Each of the elements 202, 204, 206, 208, 210, 212, 214 and 216 can be disposed within, for example, a housing, but this is by no means a requirement or limitation.

Second unit 104 comprises controller 228, display 230, display driver 232, memory 234, transceiver 220, user interface 222, audio input/output 224, and power unit 226. Transceiver 220 enables second unit 104 to communicate wirelessly, for example, with access node 106, and with first unit 102. Controller 228 can retrieve and execute software from memory 234, process data, and can communicate with and control the operation of elements 220, 222, 224, 226, 230, 232 and 234 through communication link 236. The other elements of second unit 104 are analogous to similar elements of first unit 102, and further description thereof is omitted for brevity.

In operation, first unit 102 and second unit 104 can establish communication through their respective transceivers 210 and 220. When communication is established between first unit 102 and second unit 104, one of controller 202 and controller 228 is selected, and the selected controller determines first display orientation information of first display 204 and second display orientation information of second display 230. The selected controller also determines first display layout information of first display 204 based on the first display orientation information and second display layout information of second display 230 based on the second display orientation information. The selected controller generates a first image according to the first display orientation information and the first display layout information and a second image, and controls the display of the first image on the first display 204 and the second image on the second display 230. Additionally, the first and second units 102, 104 collectively can communicate with a communication network through one of transceiver 210 and transceiver 220.

In an embodiment, first unit 102 and/or second unit 104 can receive an audio input through the audio I/O unit 214, 224 to initiate a wireless voice communication session. In an embodiment, first unit 102 and/or second unit 104 can receive an audio input through the audio I/O unit 214, 224 to respond to a received request for a wireless voice communication session (for example, to answer an incoming call request).

Figure 3:
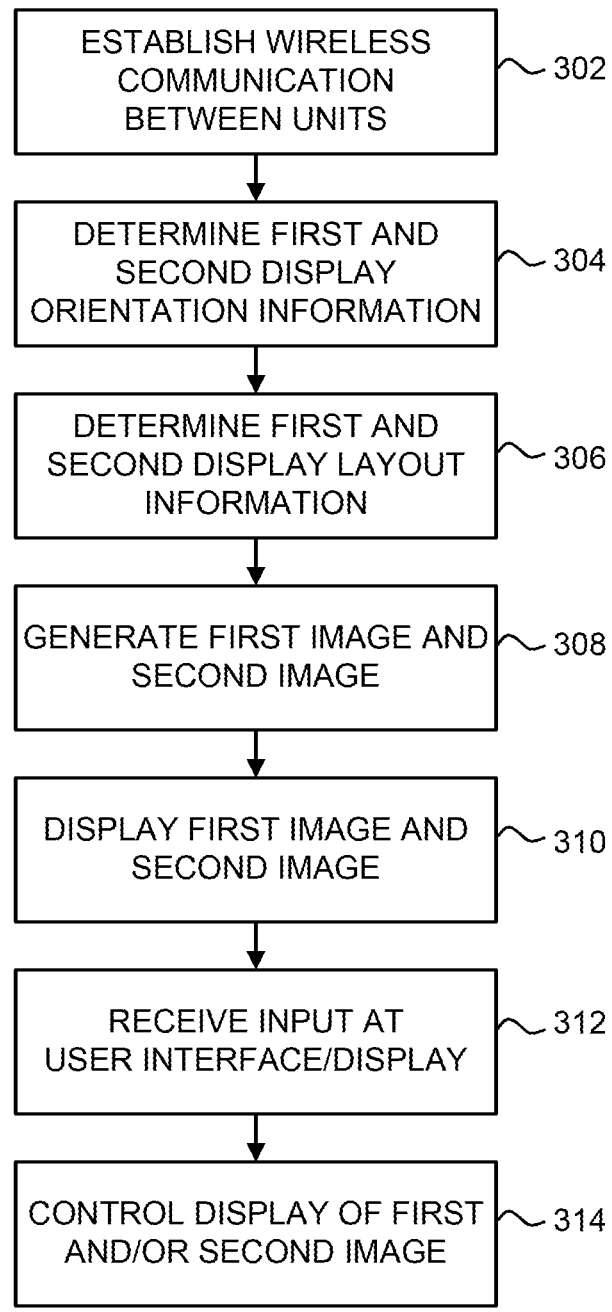
FIG. 3 illustrates an exemplary method of controlling wireless device communication.

FIG. 3 illustrates an exemplary method of controlling wireless device communication. In operation 302, wireless communication is established between first unit 102 and second unit 104 through transceivers 210 and 220. In an embodiment, the communication between first unit 102 and second unit 104 uses a short range wireless communication protocol, such as those described in IEEE 802.15 (e.g., Bluetooth, ZigBee) and IEEE 802.11 (e.g., WiFi) standards, IrDA (from the Infrared Data Association), and the like. The wireless communication between first unit 102 and second unit 104 permits, among other things, one unit to control the display of the other unit. In an embodiment, when first and second units 102, 104 communicate through transceivers 210 and 228, one unit can provide the other unit with capability information, which can comprise display capability information, processor type and speed, display driver information, memory cache information, and the like.

In operation 304, first and second display orientation information of displays 204 and 230 are determined. One of controllers 202, 228 can determine the first and second display orientation information. Additionally or alternatively, the first and second display orientation information can be determined at a network node of communication network 108. Based on the first and second display orientation information, first display layout information of display 204 and second display layout information of display 230 are determined (operation 306), and a first image of display 204 and a second image of display 230 are generated according to the respective first and second display orientation information and display layout information (operation 308).

In operation 310, image information is provided of the first image to display driver 206 and image information of the second image to display driver 232, and at the direction of the selected processor the display drivers 206 and 232 cause the display of the first and second images on displays 204 and 230, respectively. In operation 312, when an input is received at user interface 212 (which can be a touch screen enabled display 204) or at user interface 222 (which can be a touch screen enabled display 230), according to the input the display of the first and/or second image can be changed or controlled on displays 204 and 230 (operation 314).

Figure 4:
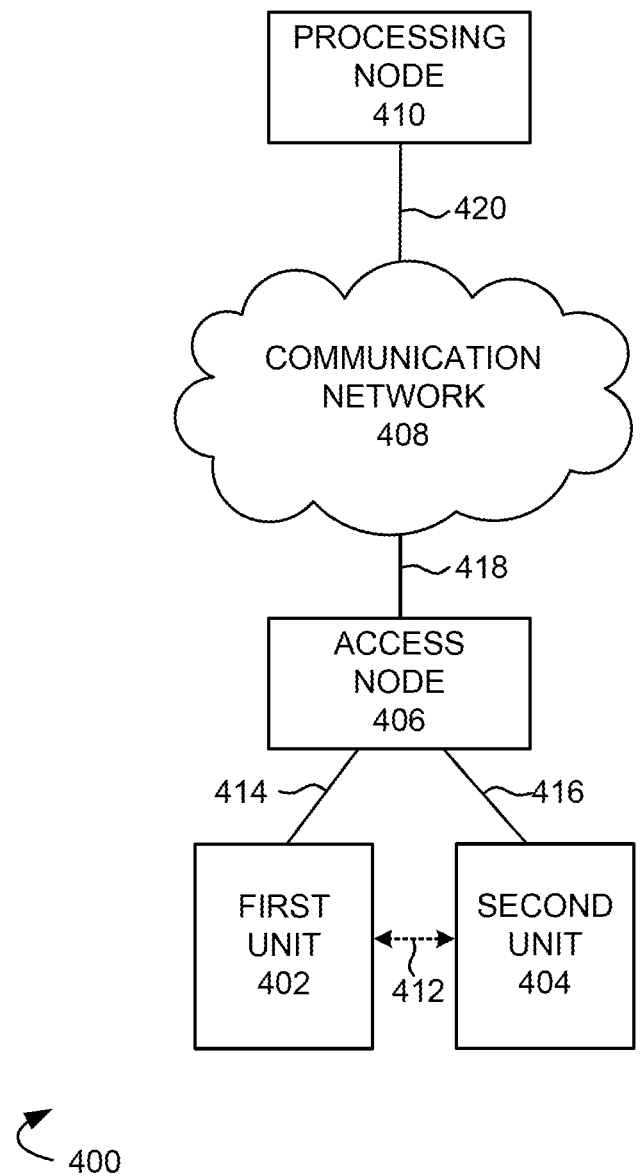
FIG. 4 illustrates another exemplary communication system to control wireless device communication.

FIG. 4 illustrates another exemplary communication system 400 to control wireless device communication comprising first unit 402, second unit 404, access node 406, communication network 408, and processing node 410. Examples of first unit 402 and second unit 404 include a cell phone, a smart phone, a computing platform such as a laptop, palmtop, or tablet, a personal digital assistant, an internet access device, or other device capable of voice communication using a plurality of dialers and communication protocols, including combinations thereof. First unit 402 and second unit 404 can communicate through communication link 412. First unit 402 and second unit 404 can also communicate with access node 406 through communication links 414 and 414, respectively. Access node 406 is a network node capable of providing wireless communications to first and second units 402, 404, and can be, for example, a base transceiver station or an eNodeB device. Access node 406 is in communication with communication network 408 through communication link 418.

Communication network 408 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 408 is analogous to communication network 108, and further description thereof is omitted for brevity.

Communication network 408 is in communication with processing node 410 through communication link 420. Processing node 410 can, among other things, control wireless device communication substantially as described herein. Processing node 410 can comprise a standalone network node, or the functionality of processing node 410 can be included in another network node such as a gateway, a proxy node, a mobility management entity (MME), or other network node capable of supporting the appropriate functionality.

Communication links 412, 414, 416, 418 and 420 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof, as well as short range communication protocols such as Bluetooth, WiFi, ZigBee, and other IEEE 802 standards. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 406, communication network 408, and processing node 410 which are omitted for clarity, including additional processing nodes, routers, gateways, and physical and/or wireless data links for carrying data among the various network elements.

Figure 5:
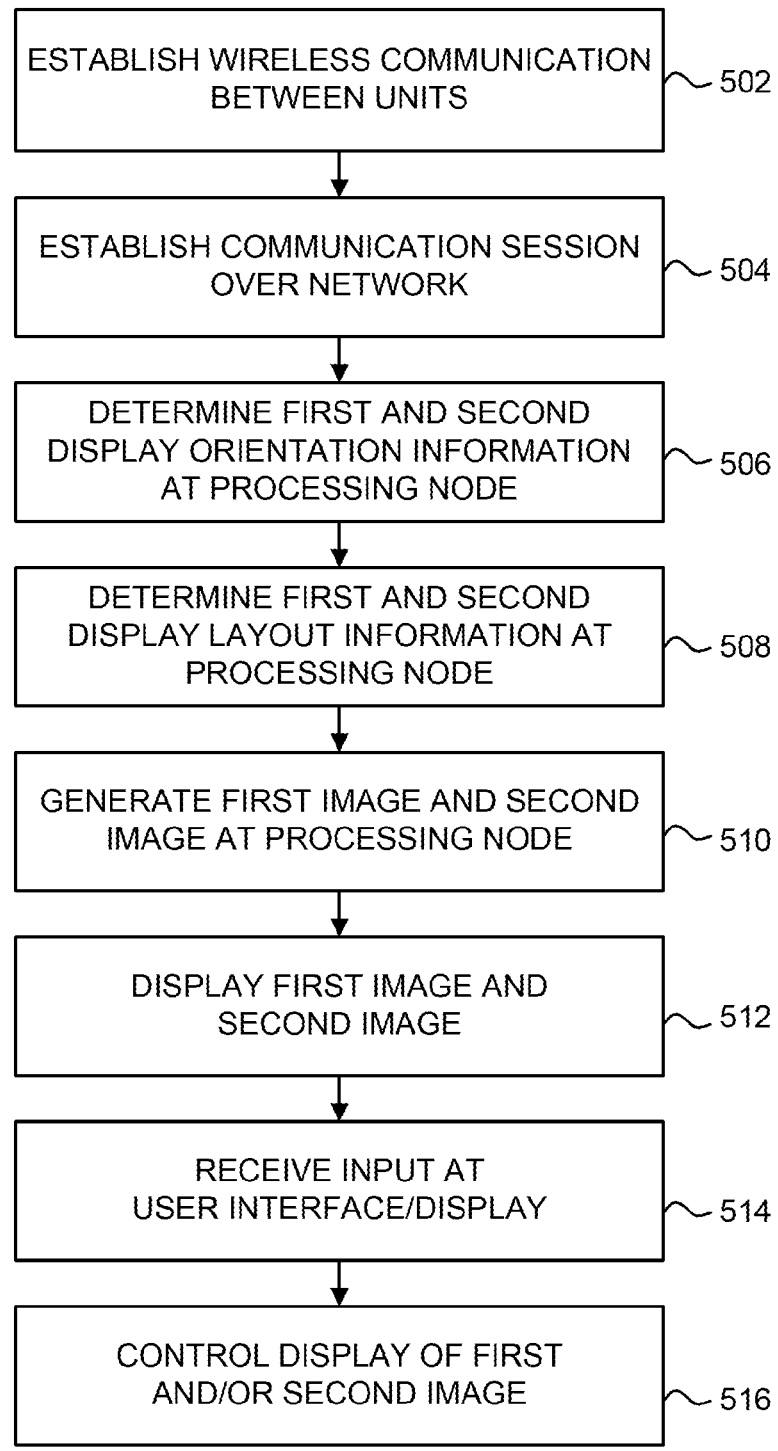
FIG. 5 illustrates another exemplary method of controlling wireless device communication.

FIG. 5 illustrates another exemplary method of controlling wireless device communication. In operation 502, wireless communication is established between first unit 402 and second unit 404. In an embodiment, the communication between first unit 402 and second unit 404 uses a short range wireless communication protocol such as those described in IEEE 802.15 (e.g., Bluetooth, ZigBee) and IEEE 802.11 (e.g., WiFi) standards, IrDA (from the Infrared Data Association), and the like. The wireless communication between first unit 402 and second unit 404 permits, among other things, one unit to control the display of the other unit.

In operation 504, wireless communication is established with a processing node 410, through communication network 408 and access node 406. While each of first and second units 402, 404 is capable of communicating independently with access node 406, in operation first unit 402 and second unit 404 communicate with access node 406 through a transceiver of one of the units (analogous to transceivers 210, 220). In an embodiment, each of first unit 402 and second unit 404 can receive or be assigned a unique network identifier, and thus each of first unit 402 and second unit 404 can be independently addressable, for example, through communication network 408. In addition, when the first and second units 402, 404 communicate with each other through their respective transceivers the wireless device can communicate with a communication network through one of the transceiver of either the first unit 402 or of the second transceiver 404.

Each of first unit 402 and second unit 404 can be separately addressable through the communication network 408. For example, each of first unit 402 and second unit 404 can have distinct network identities, or distinct network identifiers, and messages can be sent to either first unit 402 and/or second unit 404 individually. A network identifier can comprise, for example, a mobile identification number (MIN), or a media access code (MAC) ID, or an IP address, or another unique network identifier which permits first unit 402 and second unit 404 to be individually addressable. First unit 402 and second unit 404 can also be associated with an account, such as a subscriber account, and the first and second units can also each be associated with different accounts. For example, first and second units 402, 404 can be associated with a business account and a personal account, respectively. As another example, first unit 402 can be associated with an account that permits long distance calls, and second unit 404 can be associated with an account that does not. As yet another example, first unit 402 can be associated with an account that permits roaming, and second unit 404 can be associated with an account that does not. When first unit 402 and second unit 404 are in communication with each other, they may exchange associated account information, or one may provide its associated account information to the other.

Each of first unit 402 and second unit 404 can also be associated with different network service providers. For example, first unit 402 can be associated with a first network service provider, and second unit 404 can be associated with a second network provider. Thus, the wireless device can communicate with a first network of the first network service provider using the association of first unit 402 when the first network is available, and the wireless device can communicate with a second network of the second network provider when the second network is available. The wireless device could thus utilize services provided by either the first network or the second network. Additionally, the wireless device could avoid roaming since it would be able to access the networks of both the first and second network service providers through the respective first and second units 402, 404. In an embodiment, first unit 402 and second unit 404 exchange respective account information, so the wireless device can communicate through the transceiver of the first unit with a first network using account information associated with the first unit and with a second network using account information associated with the second unit. In an embodiment, the wireless device can communicate with the communication network through the first transceiver, and can use the account information of the first unit to access network services associated with the account of the first unit, and can use the account information of the second unit to access network services associated with the account of the second unit.

Each of first unit 402 and second unit 404 can also be associated with different radio access technologies. For example, first unit 402 can be utilize GSM, and second unit 404 can utilize LTE. Other examples of radio access technologies are possible, including WiMAX, UMTS, and others. The wireless device could thus comprise a first unit configured to use a first radio access technology and a second unit configured to use a second, different radio access technology, wherein each of the first unit and the second unit can be individually addressed through communication network 408. Other examples of the foregoing, and combinations thereof, are also possible.

In operation 506, first and second display orientation information of displays of first and second units 402, 404 are determined at processing node 410. Based on the first and second display orientation information, first display layout information second display layout information of displays of first and second units 402, 404 are determined (operation 508). In operation 510, a first image of the first unit display and a second image of the second unit display are generated according to the respective first and second display orientation information and display layout information.

In operation 512, image information of the first image is provided to a display driver of first unit 402, and image information of the second image is provided to a display driver of second unit 404. When an input is received at a user interface of first unit 402 or second unit 404 (operation 514), according to the input the display of the first and/or second image can be changed or controlled on displays of first unit 402 and second unit 404 (operation 516).

Figure 6:
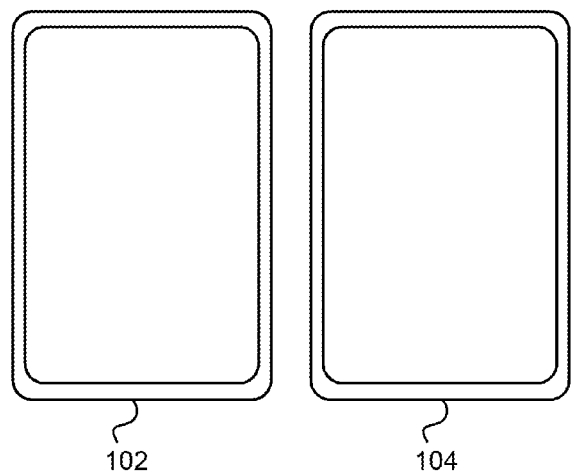
FIGS. 6-8 illustrate exemplary display orientations in a system to control wireless device communication.
Figure 7:
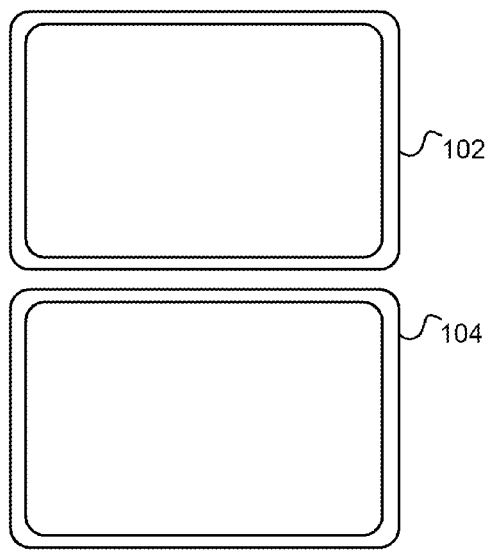
Figure 8:
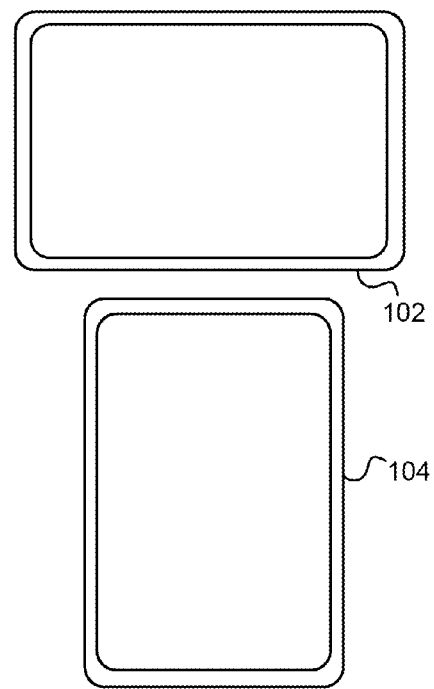

FIGS. 6-8 illustrate exemplary display orientations in a system to control wireless device communication. In FIGS. 6 and 7 illustrate exemplary display orientations in which the displays of first and second units 102 and 104 are substantially parallel. In the exemplary orientation of FIG. 6, a single image may be divided into a left portion to be displayed on first unit 102 and a right portion to be displayed on second unit 104. In addition, two images (a first image and a second image) may be displayed side-by-side on first and second units 102, 104, respectively. In the exemplary orientation of FIG. 6, a single image may be divided into a top portion to be displayed on first unit 102 and a bottom portion to be displayed on second unit 104. Also, two images may be displayed relatively above and below each other on first and second units 102, 104. Examples of a single image to be displayed comprise a photograph, a map, or a movie. Examples of a first image and a second image to be displayed comprise two photographs, two portions of a word processing document or spreadsheet, and different windows of an application such as an email application or instant messaging application. Additional examples are also possible.

FIG. 8 illustrates an exemplary display orientation in which first and second units 102, 104 are oriented substantially perpendicularly. Similar to the exemplary orientations of FIGS. 6 and 7, a first image can be displayed on first unit 102 and a second image can be displayed on second unit 104. The first and second images can be a first portion and a second portion of one image, or they can be different images.

Figure 9:
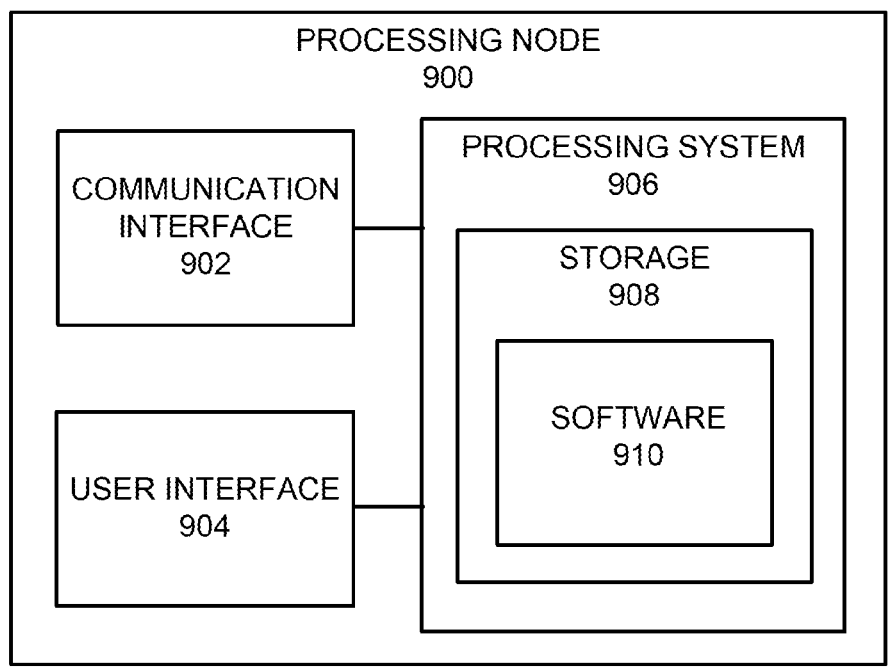
FIG. 9 illustrates an exemplary processing node.

FIG. 9 illustrates an exemplary processing node 900, comprising communication interface 902, user interface 904, and processing system 906 in communication with communication interface 902 and user interface 904. An example of processing node 900 is processing node 410. Communication interface 902 permits processing node 900 to communicate with a communication network such as communication networks 108 and 408, and with wireless devices such as first and second units 402, 404 through the communication networks. User interface 904 permits the configuration and control of the operation of processing node 900.

Processing system 906 comprises storage 908. Storage 908 comprises a disk drive, flash drive, memory circuitry, or other memory device. Storage 908 can store software 910 which is used in the operation of the processing node 900. Software 910 may include computer programs, firmware, or some other form of machine-readable instructions, including an operating system, utilities, drivers, network interfaces, applications, or some other type of software. Software 910 can also include instructions enabling processing node 900 to determine display orientation information of wireless devices, and to determine display layout information of wireless devices based on the display orientation information. Processing system 908 may include a microprocessor and other circuitry to retrieve and execute software 910 from storage 908. Processing node 900 may further include other components such as a power management unit, a control interface unit, etc., which are omitted for clarity.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless device, comprising:
    a first unit, comprising:
        a first transceiver;
        a first controller;
        a first display; and
        a first housing to support the first transceiver, the first controller, and the first display; and
    a second unit, comprising:
        a second transceiver;
        a second controller;
        a second display; and
        a second housing to support the second transceiver, the second controller, and the second display;
    wherein when the first and second units intercommunicate through the first and second transceivers, the wireless device communicates with a communication network through one of the first or second transceiver,
    wherein the first unit and the second unit each are assigned a unique network identifier when the wireless device communicates with the communication network, and
    wherein the first unit provides the unique network identifiers of the first unit and the second unit to the communication network and each of the first unit and the second unit are separately addressable through the communication network using the assigned unique network identifiers.

2. The wireless device of claim 1, wherein the first unit uses a first radio access technology, the second unit uses a second radio access technology, and each of the first unit and the second unit is individually addressable through the communication network using the assigned unique network identifiers.

3. The wireless device of claim 1, wherein the first unit and the second unit are associated with different network service providers.

4. The wireless device of claim 1, wherein the first unit and the second unit are each associated with a different network account.

5. The wireless device of claim 4, wherein when the first and second units intercommunicate through the first and second transceivers, the second unit provides the first unit with account information of the second unit.

6. The wireless device of claim 4, wherein the first unit provides the account information of the first unit and of the second unit to the communication network, and each of the first unit and the second unit is individually addressable through the communication network using the respective assigned unique network identifiers and the respective account information.

7. The wireless device of claim 4, wherein when the first and second units intercommunicate through the first and second transceivers, the wireless device communicates with a communication network through the first transceiver using the network account of the first unit and the network account of the second unit.

8. The wireless device of claim 1, wherein the second unit further comprises a user interface, and wherein when an input is received at the user interface of the second unit, one of the first controller and the second controller controls the display of at least one of a first image and a second image according to the received input.

9. A method of wireless device communication, comprising:
  communicating by a wireless device with a communication network through one of a first transceiver of a first unit of the wireless device or a second transceiver of a second unit of the wireless device when the first and second units intercommunicate through the first and second transceivers,
  wherein the first unit of the wireless device comprises:
    a first transceiver;
    a first controller;
    a first display; and
    a first housing to support the first transceiver, the first controller, and the first display, and
  wherein the second unit of the wireless device comprises:
    a second transceiver;
    a second controller;
    a second display; and
    a second housing to support the second transceiver, the second controller, and the second display,
  wherein the first unit and the second unit each are assigned a unique network identifier when the wireless device communicates with the communication network, and
  wherein the first unit provides the unique network identifiers of the first unit and the second unit to the communication network and each of the first unit and the second unit are separately addressable through the communication network using the assigned unique network identifiers.

10. The method of claim 9, wherein the first unit uses a first radio access technology, the second unit uses a second radio access technology, and each of the first unit and the second unit is individually addressable through the communication network using the assigned unique network identifiers.

11. The method of claim 9, wherein the first unit and the second unit are associated with different network service providers.

12. The method of claim 9, wherein the first unit and the second unit are each associated with a different network account.

13. The method of claim 12, wherein when the first and second units intercommunicate through the first and second transceivers, the second unit provides the first unit with account information of the second unit.

14. The method of claim 12, wherein the first unit provides the account information of the first unit and of the second unit to the communication network, and each of the first unit and the second unit is individually addressable through the communication network using the respective assigned unique network identifiers and the respective account information.

15. The method of claim 12, wherein when the first and second units intercommunicate through the first and second transceivers, the wireless device communicates with a communication network through the first transceiver using the network account of the first unit and the network account of the second unit.

16. The method of claim 9, wherein the second unit further comprises a user interface, and wherein when an input is received at the user interface of the second unit, one of the first controller and the second controller controls the display of at least one of a first image and a second image according to the received input.

* * * * *